United States Patent [19]
McClure

[11] Patent Number: 5,179,475
[45] Date of Patent: Jan. 12, 1993

[54] STRAY FIELD AND DC REMANENT SUPPRESSION IN HIGH-SPEED MAGNETIC TAPE DUPLICATOR APPARATUS HAVING AN ARRAY OF PERMANENT MAGNETS PRODUCTIVE OF A SPATIALLY VARYING TRANSFER FIELD

[75] Inventor: Richard J. McClure, San Diego, Calif.

[73] Assignee: Eastman Kodak Company, Rochester, N.Y.

[21] Appl. No.: 656,667

[22] Filed: Feb. 19, 1991

[51] Int. Cl.$^5$ .............................. G11B 5/09
[52] U.S. Cl. ..................................... 360/17
[58] Field of Search ........................ 360/15, 16, 17

[56] References Cited
U.S. PATENT DOCUMENTS 4,110,797  8/1978  Hoshino et al. ..................... 360/17
4,422,106  12/1983  Sawazaki ............................ 360/17

Primary Examiner—Vincent P. Canney
Attorney, Agent, or Firm—Dennis P. Monteith

[57] ABSTRACT

An array of an odd number of alternatingly polarized permanent magnets of equal pole strength, disposed in side by side relationship, provides a spatially varying magnetic transfer field for a master and slave tape wrapping a rotatable capstan. First and second terminator magnets, located, respectively, at opposite ends of the array, are similarly polarized with respect to each other, but opposite the polarization of the end magnets of the array. Furthermore, each terminator magnet has a magnetic moment that is less than the magnetic moment of each magnet in the array. Each terminator magnet serves (1) to suppress stray magnetic fields associated with the corresponding end magnet in the array, and (2), in combination with the odd number of alternatingly polarized magnets in the array, to suppress DC residual magnetization in the slave tape.

3 Claims, 3 Drawing Sheets

STRAY FIELD AND DC REMANENT SUPPRESSION IN HIGH-SPEED MAGNETIC TAPE DUPLICATOR APPARATUS HAVING AN ARRAY OF PERMANENT MAGNETS PRODUCTIVE OF A SPATIALLY VARYING TRANSFER FIELD

BACKGROUND OF THE INVENTION

1. Field of the Invention

This invention relates to the field of magnetic recording, and in particular to the duplication of recorded information from a magnetically recorded master medium to a slave magnetic medium.

2. Description Relative to the Prior Art

A variety of techniques are known in the art for the duplication of a recording from a master tape to a slave copy. The methods may be divided into two broad classes; the head-to-head duplication method wherein the master tape is played back on an appropriate reproducer and the resultant signal is used to drive a series of recorders which generate the slave copies, and the contact duplication methods wherein the master and slave media are placed in intimate contact and the transfer accomplished by means of an anhysteretic recording process or by a thermal recording process.

In anhysteretic processing, the master tape, which typically has a coercivity of three times that of the slave tape, is placed in intimate contact with the slave tape. The in-contact master and slave are transported through a decreasing amplitude alternating sign magnetic field which successively switches the magnetization of the distribution of magnetic particles of the slave between the two magnetic states of the particles. As the tapes traverse the field, and as the field amplitude decreases, the remanent magnetization of the slave assumes a value proportional to the magnetization of the master. The field, known as the bias field or transfer field, is not of great enough amplitude to substantially affect the magnetization of the master tape.

The thermal recording process utilizes $CrO_2$ or other low Curie point magnetic particle tape as the slave. The $CrO_2$ tape is heated to lower its coercivity while placed in contact with the master tape. The master tape and the slave are then transported together (without the use of a transfer field), and as the $CrO_2$ cools, its coercivity increases and its magnetization becomes fixed at a level determined by the signal on the master tape.

A detailed discussion of the above tape duplication methods may be found in the "Magnetic Recording Handbook", Mee and Daniel, McGraw-Hill Publishing Company, 1989, pp. 959–968.

For further consideration of the anhysteretic method, reference is made to FIG. 1, which schematically represents a typical anhysteretic duplication device known in the art. A master tape 10 and a slave tape 12 feed from supply reels 14,16 respectively. The tapes 10 and 12 are placed in intimate contact while they traverse a transfer field typically generated by a single gap magnetic head 18 driven by an a.c. generator 20. Considering the segments of the tapes 10,12 which are in contact as the tapes traverse the field of the head 18, it will be seen that the segments in contact experience a monotonically diminishing transfer field as they move away from the head 18. As described above, this results in the master's recorded information being imprinted onto the slave. The master tape 10 and the duplicated slave tape 12 are then wound onto takeup reels 22,24 respectively.

It is known in the art that the in-contact segments of the master and slave tapes 10,12 must experience several cycles of the transfer field in order to effect the duplication. It will therefore be appreciated that if the speed of the tapes 10,12 is increased in an attempt to increase the duplication rate, the frequency of the generator source 20 must correspondingly increase. This requires increased currents from the source generator 20 to drive circuit and stray capacitances, and also results in increased power dissipation in the head 18 due to higher frequency losses in the head core material.

The above duplication speed problem was recognized in U.S. Pat. No. 3,519,760 entitled "Magnetic Duplicating Apparatus Using a Multiple Gap D.C. Head", issued in the name of E. T. Hatley. This patent discloses a multi-gap d.c. excited head, or a multi-permanent-magnet head, which generates a spatially varying, but time invariant magnetic field to serve as a transfer field. In duplicating apparatus utilizing such a transfer field, each segment of the in-contact master and slave tapes, while traversing the magnetic transfer field, will experience magnetization reversals equal to twice the number of spatial cycles of the magnetic field generated by the head regardless of tape speed. The use of a spatially extensive, time-invariant field accordingly overcomes the duplication speed limitation inherent in the use of the a.c. driven, single gap head considered in the prior art apparatus of FIG. 1.

There are, however, other problems incident to tape duplication through the use of the apparatus incorporating the multiple gap head of the above referenced patent. It is known in the art that slippage between the in-contact master and slave tapes as they pass through the transfer field is severely detrimental to duplication of the short-wavelength signals. (See, for example, "Magnetic Recording Handbook", Mee and Daniel, supra, page 964.) U.S. Pat. No. 3,519,760 teaches the use of a spring-loaded pressure pad which obviates such slippage by forcing the master and slave firmly together against the planar face of the multiple gap transfer head as they move past the head. This solution, however, limits the tape speed, and resultantly the duplication speed, due to the heating of the tapes by friction at the interface with both the pressure pad and the multi-gap head. The temperature rise due to such heating detrimentally alters both the magnetic and structural properties of the tapes as well as causes excessive wear of the transfer-field head.

The apparatus disclosed in U.S. Pat. No. 3,519,760 also suffers from the disadvantage in that the magnetic transfer head has an even number of alternating magnetic pole elements. This configuration causes the respective fields of the first and last pole elements to be in opposite directions, which results in stray magnetic fields as well as magnetic coupling between the first and last elements via a flux path through the tapes. The stray magnetic fields are potentially harmful to magnetic equipment and media whereas the magnetic coupling gives rise to a DC remanent field in the slave tape that causes harmonic distortion in the duplicated recording.

SUMMARY OF THE INVENTION

In view of the foregoing, an object of the invention is to provide an improved high-speed anhysteretic tape duplicating equipment of relatively simple design and construction in which a master tape and a slave tape are subjected to several cycles of a spatially varying magnetic transfer field which does not give rise to a DC remanent component in the slave tape and in which stray magnetic fields are suppressed.

The object of the invention, insofar as providing anhysteretic tape duplicating apparatus of simple design and construction, is achieved by means of an array of alternatingly polarized permanent magnets of equal pole strength. The magnets of the array are disposed with alternating flux-exiting and flux-returning pole faces in side by side relationship in the direction of media travel. The effect of this arrangement is to subject the master tape and the slave tape to several cycles of a spatially varying magnetic field.

The object of the invention, insofar as providing a high-speed information-transfer zone, is achieved by providing a rotatable capstan having a circumferential surface with a high coefficient of friction, and means for transporting the master tape and the slave tape in contact with each other while partially wrapped around the circumferential surface of the capstan. The flux-exiting and flux-returning pole faces of the array of alternatingly polarized permanent magnets are spaced from but aimed at the circumferential surface of the capstan.

The effect of this arrangement is the master tape and the slave tape move together at high speed in intimate, non-slipping contact, through multiple cycles of a spatially varying magnetic transfer field, without contacting or rubbing against the array of permanent magnets. Both tapes not only move synchronously together, but they move synchronously with the capstan, and thereby prevent the generation of heat-producing friction effects caused by the two tapes moving relative to each other while in contact or moving relative to the capstan.

Finally, the object of the invention, insofar as producing a spatially varying magnetic transfer field which is relatively free of stray magnetic fields and which does not give rise to a DC remanent component in the slave tape, is achieved by providing an array of an odd number of alternatingly polarized permanent magnets of equal strength. By having an odd number of alternatingly permanent magnets, the fields produced by the first and last magnets in the array are in the same direction, thereby precluding magnetic coupling between these two elements through the tapes. In addition, the array is sandwiched between first and second terminator magnets, which are similarly polarized with respect to each other but opposite the polarization of the end magnets in the array. Furthermore, each terminator magnet has a magnetic moment that is less than the magnetic moment of each permanent magnet in the array. The effect of this arrangement is the suppression of stray magnetic fields at each end of the array.

These advantages, i.e., a tape duplicating system of simple design and construction in which stray magnetic fields are suppressed and which does not give rise to a DC remanent component in the slave tape, as well as other advantages of the invention, will become more apparent in the detailed description of preferred embodiments presented below.

BRIEF DESCRIPTION OF THE DRAWINGS

The invention will be described in relation to the figures, of which.

DESCRIPTION OF THE PREFERRED EMBODIMENT

Figure 1:
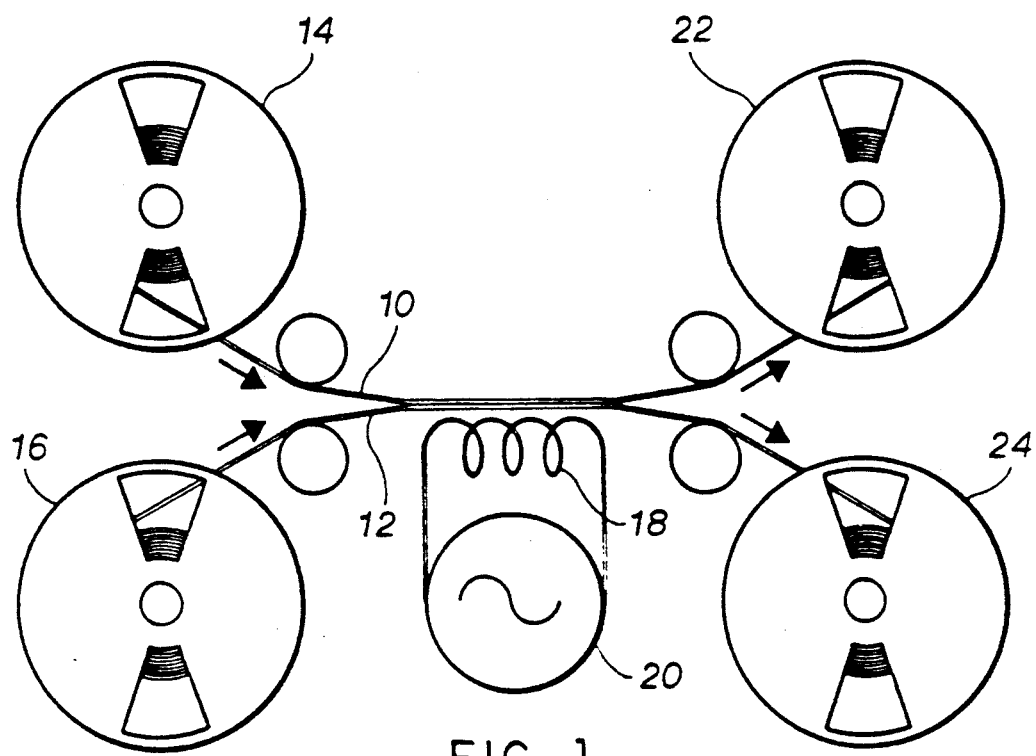
FIG. 1 is a schematic drawing of anhysteretic duplication apparatus known in the art.
Figure 2:
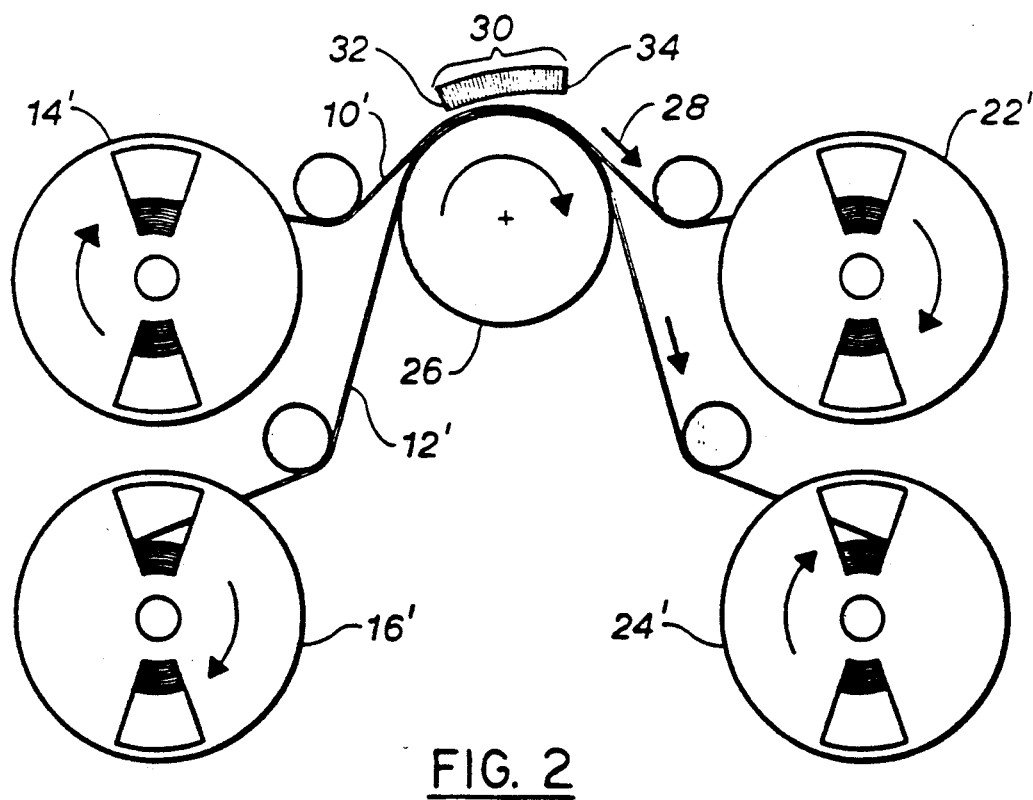
FIG. 2 is a schematic drawing of a presently preferred embodiment of anhysteretic duplication apparatus according to the present invention.

Referring to FIG. 2, a slave tape 12' feeds from a supply reel 16' over a capstan 26 having a high coefficient of friction surface, to a take up reel 24'. (Elements of FIG. 2 that are related to elements of FIG. 1 are identified by the same reference numeral, albeit related elements in the drawings are distinguished by the use of primes.) A master tape 10' feeds from supply reel 14' with its magnetic material side in contact with the magnetic material side of the slave tape 12' as they both wrap partially around the capstan 26. After leaving the capstan 26, the master tape 10' is reeled onto a take-up reel 22'. The wrap of the tapes 10',12', and the tension applied to the tapes 10',12', by means of the supply and take-up reels, is sufficient to insure non-slippage of the tapes 10',12', relative to each other, and relative to the capstan 26. The direction of tape movement is indicated by the arrow 28.

The invention requires that the slave tape 12' be free of a DC remanent component. To that end, an array 30 of an odd number of alternatingly polarized permanent magnets of equal pole strength, i.e., the same magnetic moment, is disposed adjacent the angular segment of the circumferential surface of the capstan 26 that wraps the master tape 10' and the slave tape 12'. The magnets are disposed in side by side relationship, with alternating flux-exiting pole faces and flux-returning pole faces spaced from but aimed at the circumferential surface of the capstan 26, so that several alternating fields (cycles), associated with the array 30 of magnets, intersect the in-contact segments of the tapes 10',12' at the capstan 26. These fields comprise the bias field or transfer field for effecting the duplication of the information recorded on the master tape 10' onto the slave tape 12'.

Because the array 30 consists of an odd number of alternatingly polarized permanent magnets, the field at the magnet 37a, at one end of the array 30, is in the same direction as the field at the magnet 37b, at the opposite end of the array. This arrangement precludes the formation of a longitudinal magnetic component from one end of the array 30 to the other end, through the slave tape 12'. In other words, the slave tape 12' is free of a DC remanent component.

The invention also requires that stray magnetic fields be suppressed in the zone at which information transfer from the master tape 10' to the slave tape 12' occurs. For that purpose, the array 30 is sandwiched between a pair of terminator magnets 38, 40. The terminator magnets 38, 40 have the properties of being polarized in the same direction, thereby, preserving the preclusion of a DC remanent field in the slave tape 12'.

The terminator magnets 38, 40 are also characterized as being polarized in a direction opposite their respective adjacent magnets, i.e., permanent magnets 37b and 37a, and as having a total magnetic moment that is less than the magnetic moment of each permanent magnet in the array 30. Since the end magnets 37a and 37b of the array 30 have their flux-issuing pole faces aimed at the slave tape 12', the terminator magnets 38, 40 have their flux-issuing pole faces directed away from the slave tape. In other words, each terminator magnet has its flux-returning pole face aimed at the slave tape 12'.

Figure 3:
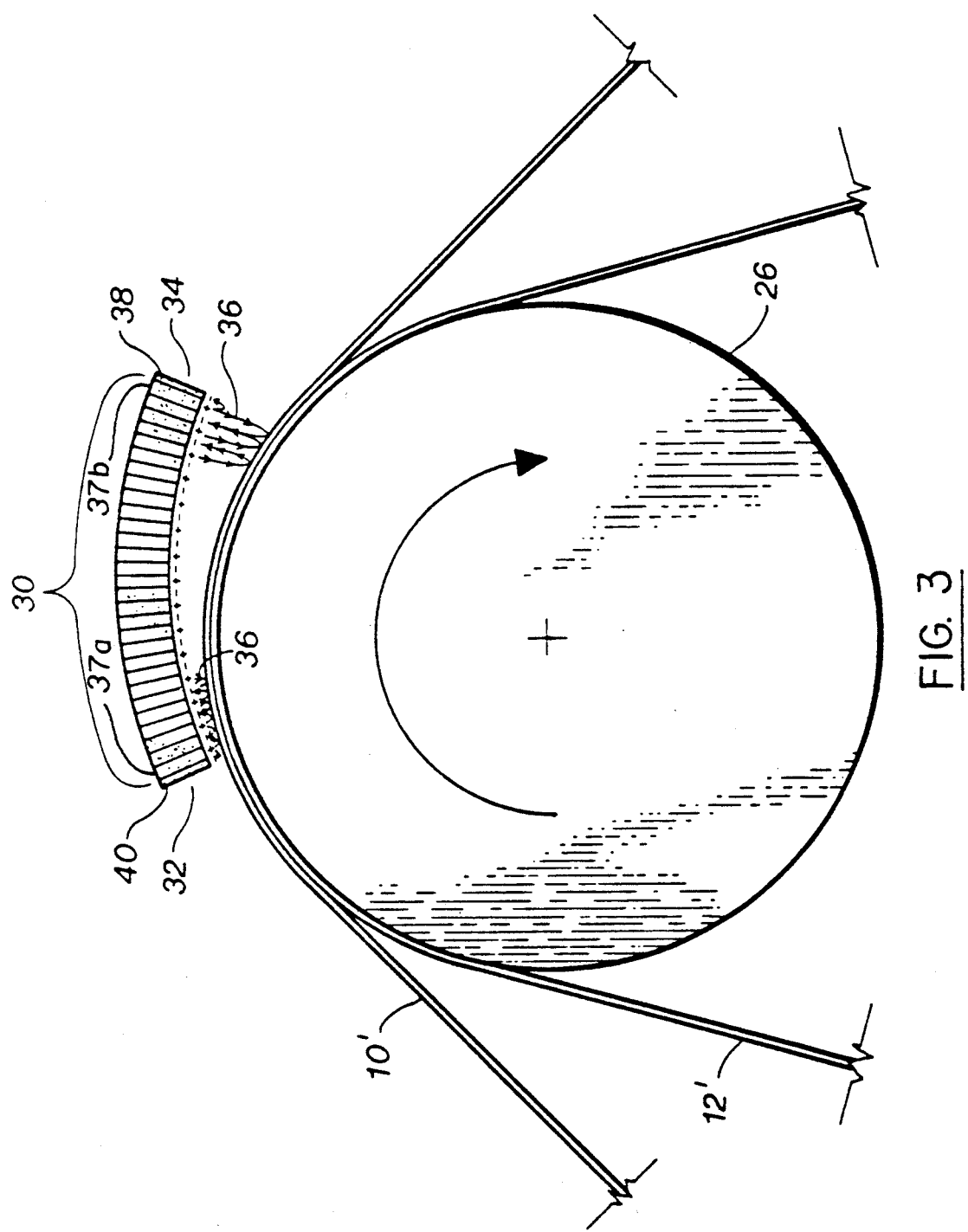
FIG. 3 is an expanded drawing of a portion of the apparatus of FIG. 2.

In a presently preferred embodiment, each terminator magnet 38, 40 has a total magnetic moment that is approximately one-half the total magnetic moment of each permanent magnet in the array 30. To that end, each terminator magnet 38, 40 has a width (or thickness) that is approximately one-half the width of a permanent magnet of the array 30, as shown in FIG. 3.

With this arrangement, one-half of the stray field from an end magnet in the array 30, i.e., magnet 37a or 37b, goes to the adjacent magnet in the array 30, i.e., the second magnet from the end of the array, and the other half of the stray field from an end magnet in the array goes to the adjacent terminator magnet. Any stray fields result primarily from the terminator magnets; and since these terminator magnets have a lower magnetic moment, any stray fields that are uncompensated are thereby suppressed.

As described above, to effect the duplication from master to slave, it is desired that the transfer field subject the slave tape to several alternating cycles of gradually diminishing strength as the tapes travel through the field. As the field associated with a magnetic pole falls off proportionately to distance, the end 32 of the array 30 of fixed magnets is closest to the in-contact tapes 10',12' wrapping the capstan 26, and the end 34 is furthest away from them. Each magnet of the array 30 is incrementally displaced radially outward, with respect to the capstan 26, along a common curvilinear plane disposed at a progressively greater distance from the circumferential surface of the capstan 26 in the direction of media travel.

It is known in the art, that a magnetic field of wavelength $\lambda$ falls off at the rate, in decibels, of 55 d/$\lambda$, where d is the distance from the source of the field. Referring to FIG. 3, the array 30 comprises twenty-nine alternating polarity, side by side, magnetically identical magnets. These magnetic poles give rise to the transfer field indicated typically by the field lines 36.

In a presently preferred embodiment, the transfer field experienced by the in-contact tapes 10',12' diminishes by about 15 db from the end 32 to the end 34 of the array 30. For an array 30 comprising, for example, twenty-nine magnets of thickness 0.04", the field wavelength, $\lambda$, is 0.08" as two adjacent magnets give rise to one wavelength. In accordance with the relation that signal strength decreases by 55 d/$\lambda$, a 15 db decrease requires that the magnet 37b at end 34 be 0.021" further away from the tapes 10',12' wrapping the capstan 26, than the magnet 37a at end 32. Each of the twenty-nine magnets of the array 30, therefore, is radially displaced, with respect to its neighbor magnet, from the center of the capstan 26 by 0.021"/29=0.00072". A separation of 0.015" of the end 32 of the array 30 from the capstan 26 circumference, allows adequate space for ease of threading the tapes 10',12' for contact with the capstan 26, without the tapes contacting the array 30 during tape travel. The end 34 is accordingly at a distance of 0.036" (0.015"+0.021") away from the surface of the capstan 26.

It will be noted that the 15 db decrease in field strength as the tapes 10',12' traverse the transfer field occurs over approximately 15 cycles of the field. That is, a decrease on average of 1 db per cycle.

The field emanating surface of the array 30 follows a spiral path referenced to the center of the capstan 26. From a fabrication point of view, this surface may be approximated by a cylindrical surface which passes through the inboard tips of the magnet at the end 32, the magnet at the mid-point of the array 30, and the magnet at the end 34. The radius of this approximating cylinder and the location of its center may be determined by the geometrical procedure, known in the art, of passing a circle through three non-collinear points.

Figure 4:
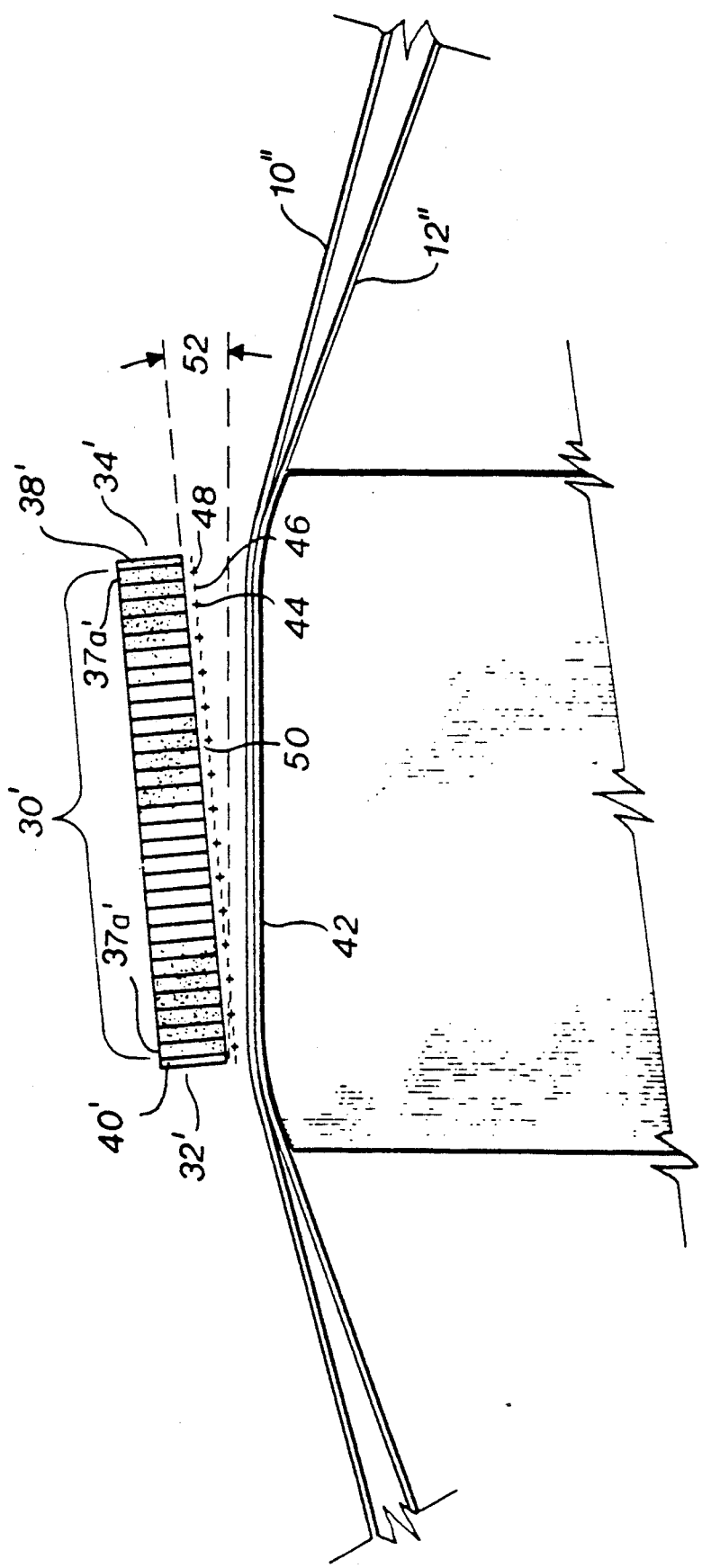
FIG. 4 is a schematic drawing of an alternative preferred embodiment of the present invention.

If speed of duplication is not an essential requirement, and the tape velocity may be kept low enough so that frictional heating is no problem, the embodiment of FIG. 4 allows simplified fabrication of a transfer field generating array 30'. In this case, the tapes 10",12" are in-contact over a planar surface 42. Adjacent to the surface 42 is the field-generating permanent magnet array 30' in which the decreasing transfer field is obtained by the linearly increasing distances of the magnetic poles, i e., 44,46,48 in the array 30', from the surface 40. The slope of the ramp surface 50 to obtain required decrement of the field is determined in the manner described above for the spiral surface of the array 30 of FIG. 3. Using the figures of the previous example, the ends 32',34' are offset by 0.021". The array 30' of twenty-nine 0.04" wide magnets arranged side by side is 1.2" long. Therefore, the angle 52 is approximately 1 degree, viz., (angle $52 = \sin^{-1} 0.021/1.2$). It will be appreciated that the linear ramped array 30' is simpler to fabricate than the curvilinear array 30 of FIG. 3.

The invention has been described in detail with particular reference to preferred embodiments thereof, but it will be understood that variations and modifications can be effected within the spirit and scope of the invention. Patentable features disclosed but not claimed herein are disclosed and claimed in U.S. patent application entitled HIGH-SPEED MAGNETIC TAPE DUPLICATOR APPARATUS HAVING AN ARRAY OF PERMANENT MAGNETS PRODUCTIVE OF A SPATIALLY VARYING TRANSFER FIELD OF GRADUALLY DIMINISHING STRENGTH.

What is claimed is:

1. In anhysteretic magnetic tape duplicating equipment of the type in which a master tape and a slave tape are subjected to multiple cycles of a spatially varying magnetic transfer field while moving along a predetermined path through an information-transfer zone, the improvement comprising:

a) an array of an odd number of alternatingly polarized permanent magnets of equal pole strength disposed in side by side relationship in the information-transfer zone with alternating flux-issuing and flux-returning pole faces aimed at the predetermined path, the effect of which is to subject the master tape and the slave tape to multiple cycles of an alternating transfer field as the master tape and the transfer tape move through the information-transfer zone; and b) first and second terminator magnets, disposed, respectively, at opposite ends of said array, similarly polarized with respect to each other and opposite the polarization of the end magnets in said array, each of said first and second terminator magnets having a magnetic moment that is less than the magnetic moment of each magnet in said array, the effect of each terminator magnet being primarily (1) to suppress stray magnetic fields associated with the end magnet in the array, and (2), in combination with the odd number of permanent magnets in said array, to suppress DC residual magnetization in the slave tape.

2. Anhysteretic magnetic tape duplicating equipment as defined in claim 1 wherein the magnetic moment of each of said terminator magnet is approximately one-half the magnetic moment of each magnet in said array.

3. In anhysteretic magnetic tape duplicating equipment of the type in which a master tape and a slave tape are subjected to several cycles of a spatially varying magnetic transfer field while moving at a relatively high speed through an information-transfer zone, the improvement comprising:
   a) a rotatable capstan having a circumferential surface at least a portion of which is disposed in the information-transfer zone;
   b) means for transporting the slave tape and the master tape through the information-transfer zone while partially wrapped around said circumferential surface of said capstan;
   c) an array of an odd number of alternatingly polarized permanent magnets of equal pole strength situated in side by side relationship in the information-transfer zone with alternating flux-issuing pole faces and flux-returning pole faces aimed at said circumferential surface of said capstan, the effect of which is to subject the master tape and the slave tape to an alternating transfer magnetic field in the direction that the slave tape and the master tape are moving through the information-transfer zone; and
   d) first and second terminator magnets, disposed, respectively, at opposite ends of said array, similarly polarized with respect to each other and opposite the polarization of the end magnets in said array, each of said first and second terminator magnets having a magnetic moment that is less than the magnetic moment of each magnet in said array, the effect of each terminator magnet being primarily (1) to suppress stray magnetic fields associated with the end magnet in the array, and (2), in combination with the odd number of permanent magnets in said array, to suppress DC residual magnetization in the slave tape.

* * * * *